United States Patent [19]
Kononenko et al.

[11] 4,021,911
[45] May 10, 1977

[54] METHOD FOR PRODUCING AN IRON ELECTRODE FOR AN ALKALINE ACCUMULATOR

[76] Inventors: Viktor Evmenievich Kononenko; Nina Stepanovna Kononenko, both of poselok "Akkumulyator", 31, kv. 7; Valentina Nikolaevna Tamazina, ulitsa Radischeva, 71/1, kv. 20; Valentina Nikolaevna Baranova, ulitsa Dzerzhinskogo, 88, kv. 12; Viktor Andreevich Gaintsev, ulitsa Lenina, 108, kv. 7; Alexandr Jurievich Kuzin, poselok "Akkumulyator", 30, kv. 16; Gennady Ivanovich Pankov, ulitsa Mirnaya, 2, kv. 48, all of Kursk; Boris Isaakovich Fishman, ulitsa Tikhoretsky prospekt, 9, korpus 7, kv. 70; Tamara Konstantinovna Teplinskaya, prospekt Kosmonavtov, 20, korpus 2, kv. 59, both of Leningrad, all of U.S.S.R.

[22] Filed: Jan. 7, 1976
[21] Appl. No.: 647,459
[52] U.S. Cl. .............................. 29/623.5; 429/221
[51] Int. Cl.$^2$ ......................................... H01M 4/04
[58] Field of Search ............ 136/25, 120 R, 75, 28, 136/29, 1; 29/623.5; 429/221

[56] References Cited
UNITED STATES PATENTS

| | | | |
|---|---|---|---|
| 3,525,640 | 8/1970 | McCormick et al. | 136/25 X |
| 3,849,198 | 11/1974 | Seidel | 136/25 |

*Primary Examiner*—Anthony Skapars
*Attorney, Agent, or Firm*—Lackenbach, Lilling & Siegel

[57] ABSTRACT

Disclosure is made of a method for producing a coated iron electrode of an alkaline accumulator. Into an active mass comprising black iron ore concentrate, iron oxide, synthetic fiber, ferrous sulphide and an aqueous solution of nickel sulphate there is introduced an aqueous solution of surface-active compounds. The active mass is spread on a steel-band grid, which is followed by drying and treating the electrode thus produced with a binder, the binder being a suspension of sodium or ammonium bicarbonates, or lithium hydroxide in an epoxide resin solution with an addition of a hardener of the polyethylenepolyamine type. Upon drying, the electrode thus produced possesses improved electric characteristics and mechanical strength, the weight of the electrode is reduced, and its service life is prolonged.

6 Claims, No Drawings

METHOD FOR PRODUCING AN IRON ELECTRODE FOR AN ALKALINE ACCUMULATOR

The present invention relates to accumulators and, more specifically, to a method for producing an iron electrode for an alkaline accumulator.

There is known a method for producing a lamellar electrode for nickel-iron batteries (cf. G. G. Drachyov, Yu.P. Galuzin, "Komplexnaya mechanizatsiya proizvodstva akkumulyatorov" /"All-Round Mechanization of Accumulator Production"/ Energhia Publishers, Leningrad Division, 1969). According to this method a negative electrode is produced by reducing a mixture of ore concentrate and iron oxide with one of the known reducing agents, for example, iron powder. The process is carried out at a high temperature to obtain ferric-ferous oxide.

The active mass of a negative electrode comprises a mixture of metallic iron and its oxides with small additions of nickel sulphate and iron sulphate, and graphite is added thereto as the electrically conducting substance. The active mass is pressed, in the form of powder, into a steel grid (lamella). Lamellar electrodes are a set of flat boxes (lamellae) of perforated steel band, filled with an active mass. Being joined together, the lamellae make up an electrode. The end faces of the lamellae are covered with profiled ribs. The purpose of a lamella is to prevent the active mass from crumbling. The manufacture of lamellar electrodes is an extremely laborious process. The use of the active mass in the form of a powder accounts for the high dust content and for the inferior working conditions in the shops. In addition, the supporting part of the electrode, i.e., the grid and the ribs, accounts for approximately one-half of the electoode's weight and for a substantial portion of its volume. The metal of this part is not involved in the electrochemical reactions and is thus a deadweight. Placed in a perforated envelope, the active mass proves to be ineffective, as the area of the perforated openings in the lamellae constitutes only 5 to 8 percent. As a result, the access of the electrolyte into the electrode is hindered; naturally, this affects the electric characteristics of the accumulator.

The problem of providing a non-lamellar electrode is of great practical interest. There is known a method for producing a non-lamellar cadmium electrode (cf. Japanese Patent No. 66,369, publ. 17545/71, Cl. H01m, granted to Matsushita Denki Sangyo K. K.). According to this method, there is added to the active mass of an electrode an electrically conducting compound and a resin of the polyvinyl chloride type, which serves as a binder. Prior to this the polyvinyl chloride is mixed with a liquid which effectively dissolves it, like tetrahydrofuran, as well as with a liquid that does not dissolve it, like ethylene glycol. The active mass is mixed with the liquid mixture thus obtained and is spread on a metal grid, which is followed by drying. However, the introduction into the active mass of a chemically inert binder, like polyvinyl chloride, makes the mass to a considerable extent screened, so the utilization factor of the active iron is sharply reduced. In addition, there is always the danger of particles being washed out and of slurry being produced, which may lead to short-circuiting. The partial insulation of the active mass by the binder does not make it possible to reduce the active cadmium content per 1 ampere-hour. The method under review is unfit for the production of iron electrodes due to the above-mentioned disadvantages which are most strongly manifest in the production ad uses of iron electrodes.

There is also known a method for producing cadmium electrodes for sealed Ni-Cd accumulators (cf. U.S. Pat. No. 3,600,226, Cl. H01m, m, 43/04).

A mixture of CdO and CuO is pressed into a grid of Ni or Fe. The ratio between the mixture's components varies from 1:2 to 2:1. Subsequent electrochemical reduction of the oxides produces Cu which is an electrically conducting base which is conducive to uniform current distribution in the electrode in the course of cycling. The presenceof Cu prevents the growth of Cd crystals, as well as the reduction of the accumulator's storage capacity in the course of cycling. It is advisable to use homogeneous, in terms of dispersion, CdO and CuO powders. The diameter of the particles must not differ by more than 20 percent from the mean value. If powders with different degrees of dispersion are used, a gradual reduction in the storage capacity of the accumulator is observed in the course of cycling.

It is an object of the present invention to provide a pasted iron electrode for alkaline accumulators, which would have superior electric and strength characteristics, as compared to conventional lamellar iron electrodes.

The foregoing object can be attained by utilizing the proposed method for producing a pasted iron electrode for alkaline accumulators, according to which into an active mass comprising black iron ore concentrate, iron oxide, synthetic fiber, ferrous sulphide and an aqueous solution of nickel sulphate there is introduced an aqueous solution of surfaceactive compounds in an amount of 3 to 20 parts by weight of the dry components of the active mass, after which the mixture is pressed into a steel-band grid and dried for about 5 to about to 10 minutes at a temperature range of between about 150° and about 300° C, which is followed by treating the electrode thus produced with a binder which is a 15-20% suspension of LiOH in a 20% epoxide resin solution with an addition of a hardener, for example, polyethylenepolyamine, after which the electrode is dried for about 10 to about 30 minutes at 70° to 160° C.

According to the proposed method for producing a negative pasted iron electrode, a substrate is first produced by notching and stretching a band-like steel material in longitudinal rows, the notching and stretching of all the longitudinal rows being done simultaneously with 1 to 3 notches in each row and a stepped displacement of notches in adjacent rows. An active mass for a negative pasted electrode is prepared from a mixture of black iron ore concentrate in an aamount of 95 weight parts, iron oxide ($Fe_2O_3$) in an amount of 5 weight parts, synthetic fiber in an amount of 0.1 to 0.2 weight parts, ferrous sulphate (FeS) in an amount of 0.86 to 1.25 weight parts, aqueous solutions of nickel sulphate in an amount of 15 weight parts (concentration of 135 g/l) and surface-active compounds in an amount of 3 to 20 weight parts (concentration of 3 to 4 g/l).

The introduction of surface-active compounds reduces the surface tension of the system and thus facilitates the process of homogenizing the active mass, which, in turn, improves its pasting properties. In the presence of the surface-active compounds the active sulfur content is practically unchanged after the drying, which accounts for the increased storage capacity of the electrode. The active mass is spread on a grid and rolled. As a result, the active mass becomes denser and excessive moisture is removed. After the rolling the electrode is dried at a temperature range from about 150° to about 300° C for about 5 to about 10 minutes to reduce the moisture content in the active mass to no more than 0.2 percent. The electrode is then treated with a binder which is a suspension of lithium hydroxide (LiOH) in an epoxide resin solution with an addition of a hardener of the polyethylenepolyamine type. The suspension is prepared from 150 parts weight of a 20-percent solution of epoxide resin in an organic solvent by adding thereto 10 to 15 weight parts of lithium hydroxide and 2.5 to 3 weight parts of polyethylenepolyamine.

In the course of treatment the suspension (the binder) penetrates into the surface layers of the active mass and binds ints particles. As a result, a solid reinforcing film-like layer is produced on the electrode's surface.

After being treated with the binder, the electrode is dried for about 10 to about 30 minutes at a temperature range of from about 70° to about 160° C. In the course of drying the binder is hardened, and volatilization of the solvent takes place. As a result, the integrity of the surface layer is impaired due to the formation of pores, whereas the activity of the mass is almost fully preserved, unlike in the case of the method whereby a binder is introduced into the active mass.

The substantially raises the utilization factor of the active iron, accounts for a high mechanical strength of the electrode and completely rules out the possibility of the active mass being washed out during the lifetime of the accumulator. As a result, it has become possible to reduce by 30 percent the iron content per 1 ampere-hour, reduce the electrode's weight two-fold, prolong the service life and raise the reliability of the accumulators.

What is claimed is:

1. A method for producing an iron electrode of an alkaline accumulator comprising the steps of introducing into an active mass, which comprises black iron ore concentrate, iron oxide, synthetic fiber, ferrous sulphide and an aqueous solution of nickel sulphate, an aqueous solution of surface-active compounds in an amount of 3 to 20 weight parts with respect to the weight of the dry components of the active mass; pressing the mixture into a steel-band grid and drying for a period of time from about 5 minutes to about 10 minutes at a temperature range of from about 150° to about 300° C; treating the electrode thus produced with a binder, said binder being a suspension of lithium hydroxide in a 20% solution epoxide resin and a hardener; drying the electrode for a period of time of from about 10 minutes to about 30 minutes at a temperature range of from about 70° to about 160° C.

2. The method of claim 1, wherein the hardener is a polyethylenepolyamine.

3. The method of claim 1, wherein the active mass is made up of ninety-five weight parts of said black iron ore concentrate, five weight parts of said iron oxide, one tenth to two tenths weight parts of said synthetic fiber, eighty-six hundredths to one and one-quarter weight parts of said ferrous sulphate and fifteen weight parts of said aqueous solution of nickel sulphate; and wherein the concentration of said aqueous solution of nickel sulphate is 135 g/l and the concentration of said surface-active compounds is 3 to 4 g/l.

4. The method of claim 1, wherein the pressing step comprises spreading the active mass on a grid and then rolling said active mass.

5. The method of claim 2, wherein said binder is made up of ten to fifteen weight parts of lithium hydroxide, one hundred and fifty weight parts of said 20% solution of epoxide resin and two and a half to three weights parts of polyethylenepolyamine.

6. The method of claim 5, wherein the epoxide resin is in an organic solvent.

* * * * *